(12) United States Patent
Schwarze et al.

(10) Patent No.: US 7,963,074 B2
(45) Date of Patent: Jun. 21, 2011

(54) FIXING DEVICE FOR PHOTOVOLTAIC MODULES ON SLOPING ROOFS

(75) Inventors: Sascha Oliver Schwarze, Berlin (DE); Maik Schaefer, Berlin (DE)

(73) Assignee: Solon SE, Berlin (DE)

( * ) Notice: Subject to any disclaimer, the term of this patent is extended or adjusted under 35 U.S.C. 154(b) by 164 days.

(21) Appl. No.: 12/357,062

(22) Filed: Jan. 21, 2009

(65) Prior Publication Data

US 2009/0184223 A1     Jul. 23, 2009

(30) Foreign Application Priority Data

Jan. 21, 2008  (DE) .......................... 10 2008 005 713

(51) Int. Cl.
*F24J 2/52* (2006.01)
*E04D 13/18* (2006.01)
*H01L 31/042* (2006.01)

(52) U.S. Cl. ....... 52/173.3; 126/623; 136/244; 248/237; 248/317

(58) Field of Classification Search .............. 52/147, 52/148, 149, 151, 291, 223.13, 712; 24/298, 24/302, 265 AL, 115 R; 114/230.29, 218; 248/237; 294/74
See application file for complete search history.

(56) References Cited

U.S. PATENT DOCUMENTS

| | | | | |
|---|---|---|---|---|
| 188,442 A | * | 3/1877 | Tobin | 52/149 |
| 814,763 A | * | 3/1906 | Anderson | 52/291 |
| 834,924 A | * | 11/1906 | Meech | 403/210 |
| 978,568 A | * | 12/1910 | Eaton | 52/291 |
| 1,202,667 A | * | 10/1916 | Bearse | 52/148 |
| 1,381,616 A | * | 6/1921 | Clausen et al. | 24/115 R |
| 1,393,611 A | * | 10/1921 | Carle | 52/291 |
| 1,547,672 A | * | 7/1925 | Moore | 52/291 |
| 1,656,676 A | * | 1/1928 | Mills | 403/169 |
| 1,923,961 A | * | 8/1933 | Wood | 52/291 |
| 1,931,808 A | * | 10/1933 | Andersen | 294/74 |
| 2,152,096 A | * | 3/1939 | Russell | 294/74 |
| 2,319,303 A | * | 5/1943 | Crawford | 52/291 |
| 2,328,217 A | * | 8/1943 | Johnson | 52/148 |
| 2,485,445 A | * | 10/1949 | Hoffman | 24/135 R |
| 2,622,284 A | * | 12/1952 | Kafer | 52/291 |

(Continued)

FOREIGN PATENT DOCUMENTS

DE     19601069 A1     4/1997

(Continued)

OTHER PUBLICATIONS

Brochure "The ClickFit Mounting Structure for PV Systems", ClickFit, http://www.click-fit.com/download/ClickFit-Brochure-EN.pdf, pp. 1-4.

(Continued)

*Primary Examiner* — Robert J Canfield
(74) *Attorney, Agent, or Firm* — Leydig, Voit & Mayer, Ltd.

(57) ABSTRACT

A fixing device for fixing a photovoltaic module on a sloping roof having a roof structure and a roof covering with individual roof covering elements includes a roof-side connecting piece disposable beneath the roof covering and a module-side connecting piece disposable on an edge of the photovoltaic module. A flexible retaining element interconnects the roof-side connecting piece and the module-side connecting piece. The flexible retaining element is loadable by pulling and adapted to be guided through the roof covering without altering a position or shape of the individual roof covering elements.

13 Claims, 4 Drawing Sheets

U.S. PATENT DOCUMENTS

| | | | | |
|---|---|---|---|---|
| 2,736,398 | A * | 2/1956 | Peterson | 57/202 |
| 3,040,477 | A * | 6/1962 | June | 47/42 |
| 3,066,371 | A * | 12/1962 | Muliens | 403/206 |
| 3,079,192 | A * | 2/1963 | Otley | 294/74 |
| 3,101,695 | A * | 8/1963 | Honeyman, Jr. | 114/230.29 |
| 3,102,715 | A * | 9/1963 | Weitzel et al. | 254/134.3 FT |
| 3,186,619 | A * | 6/1965 | Le Roy et al. | 229/4.5 |
| 3,349,745 | A * | 10/1967 | Berg | 114/230.29 |
| 3,473,505 | A * | 10/1969 | Brown | 114/230.29 |
| 3,504,460 | A * | 4/1970 | Solberg | 52/98 |
| 3,702,709 | A * | 11/1972 | Saffer | 403/158 |
| 3,718,945 | A * | 3/1973 | Brindejonc de Treglode | 24/370 |
| 3,979,106 | A * | 9/1976 | Jaques | 254/134.3 FT |
| 4,058,049 | A * | 11/1977 | Bech | 87/8 |
| 4,082,054 | A * | 4/1978 | Bruner | 114/230.29 |
| 4,135,336 | A * | 1/1979 | Bogese, II | 52/147 |
| 4,190,011 | A * | 2/1980 | Guthmann | 114/230.29 |
| 4,291,673 | A * | 9/1981 | Deutz | 126/569 |
| 4,466,423 | A * | 8/1984 | Dolan et al. | 126/571 |
| 4,529,240 | A * | 7/1985 | Engel | 294/141 |
| 4,597,351 | A * | 7/1986 | Brainard, II | 267/74 |
| 4,832,001 | A * | 5/1989 | Baer | 126/579 |
| 4,850,084 | A * | 7/1989 | Iwasaki | 24/115 R |
| 5,018,775 | A * | 5/1991 | McKenna et al. | 294/74 |
| 5,020,192 | A * | 6/1991 | Gerlach | 24/136 R |
| 5,252,141 | A * | 10/1993 | Inoue et al. | 136/251 |
| 5,319,896 | A * | 6/1994 | Winger | 52/23 |
| 5,320,194 | A * | 6/1994 | Bredijk | 182/45 |
| 5,347,402 | A * | 9/1994 | Arbogast | 359/853 |
| 5,595,260 | A * | 1/1997 | Jalla | 182/3 |
| 5,687,512 | A * | 11/1997 | Spoozak et al. | 52/23 |
| 5,730,407 | A * | 3/1998 | Ostrobrod | 248/237 |
| 6,059,335 | A * | 5/2000 | Matson | 294/74 |
| 6,085,628 | A * | 7/2000 | Street et al. | 87/7 |
| 6,120,074 | A * | 9/2000 | Hamrick | 294/74 |
| 6,131,873 | A * | 10/2000 | Blazon et al. | 248/548 |
| 6,149,215 | A * | 11/2000 | Balogh et al. | 294/74 |
| 6,192,637 | B1 * | 2/2001 | Boilen et al. | 52/167.3 |
| 6,763,910 | B2 * | 7/2004 | Cole | 182/3 |
| 7,654,042 | B1 * | 2/2010 | Brown | 52/23 |
| 2001/0039686 | A1 * | 11/2001 | Daiguji et al. | 14/21 |
| 2002/0051681 | A1 * | 5/2002 | Westmoreland | 404/9 |
| 2003/0182893 | A1 * | 10/2003 | Poldmaa | 52/745.21 |
| 2007/0034449 | A1 * | 2/2007 | Leendertse | 182/45 |
| 2007/0170334 | A1 * | 7/2007 | Ambrose | 248/317 |
| 2008/0066801 | A1 | 3/2008 | Schwarze | |
| 2008/0190476 | A1 * | 8/2008 | Baruh | 136/245 |
| 2010/0065104 | A1 * | 3/2010 | Baruh | 136/251 |
| 2010/0294265 | A1 * | 11/2010 | Baer et al. | 126/680 |

FOREIGN PATENT DOCUMENTS

| | | |
|---|---|---|
| DE | 19729309 A1 | 2/1999 |
| DE | 20215867 U1 | 2/2004 |
| DE | 10344202 | 4/2004 |
| DE | 202004008499 | 10/2004 |
| DE | 102004057041 | 6/2006 |
| DE | 102005043957 | 2/2007 |
| DE | 102005061709 | 3/2007 |
| DE | 102006044418 B3 | 12/2007 |
| EP | 0890688 A1 | 1/1999 |
| EP | 1568950 A1 | 8/2005 |
| JP | 03-199565 A | 8/1991 |
| JP | 08-288532 A | 11/1996 |
| JP | 2002-134776 * | 5/2002 |
| JP | 2003-318430 * | 11/2003 |
| JP | 2004-234188 * | 4/2004 |
| WO | WO 00/12839 A | 3/2000 |

OTHER PUBLICATIONS

Brochure "Solar module mounting system; Pitched roof, one layer", Lorenz Solo, http://www.energiebau.de/fileadmin/user_upload/PDF/Datasheets/LORENZ/LORENZ_solo_en.pdf, pp. 1-4.

* cited by examiner

FIXING DEVICE FOR PHOTOVOLTAIC MODULES ON SLOPING ROOFS

CROSS REFERENCE TO PRIOR APPLICATIONS

Priority is claimed to German Patent Application No. DE 10 2008 005 713, filed Jan. 21, 2008, the entire disclosure of which is incorporated herein by reference.

FIELD

The invention relates to a fixing device for photovoltaic modules on sloping roofs with at least one retaining element with a roof-side connecting piece under a roof covering, which roof covering is made up of individual elements, on a roof structure and a module-side connecting piece on the edge of a photovoltaic module.

BACKGROUND

Many different kinds of fixing devices are known for mounting photovoltaic modules (PV modules) on sloping roofs, generally in a vertical orientation from the crown to the eaves, which fixing devices are all based on a common basic idea. In this case, the normal sloping roof consists of rafters which are arranged in a spacing of from 60 to 120 cm and define the roof slope. A sarking membrane is usually fixed to counter lathing and the roof laths on these rafters to keep out water and snow driven in by the wind. The individual elements of the roof covering are laid on the roof laths. All known roof covering materials which consist of uniform individual elements, e.g. corrugated sheets made from fiber cement, metal or wood clapboards and natural and artificial roofing tiles of all shapes, come into consideration for this purpose. The term roofing tile is used as a generalization in the following description for all roof claddings made from individual elements.

Roof hooks made from bent sheet steel or aluminum profile are preferably screwed to the rafters and passed through between the roofing tiles as fixing devices to fix PV modules. In order to enable the passing through of the roof hooks, either the roofing tiles must be reworked in terms of the width and thickness of the roofing hook, e.g. by processing with a hand grinder, or the roofing tiles must be laid without reworking, accepting a gap in the covering region. As a result of the reworking, any guarantee for the sealing of the roof covering is voided. Additionally, the roofing tiles can be destroyed or weakened to such a degree in the process that they must be replaced in the further course of the work or, in the worst case, will have a markedly shortened lifetime. Falling roofing tile pieces represent a significant danger. In addition to people, the PV modules can also be damaged. In the event that reworking is not carried out, the look and also the sealing of the roof covering is adversely affected.

A rail system, on which the PV modules can later be arranged, can be fixed onto or to the roof hook in the manner specified by the manufacturer. Disadvantageous in the case of these systems is the fact that snow and wind loads acting on the PV module act perpendicularly to the roof surface and press the roof hook in the direction of the roofing tile. If insufficient spacing of the roof hook from the roofing tile is present, the latter can be destroyed under the load.

A fixing device for solar collectors and/or PV modules, which, depending on the embodiment, has rigid roof hooks for hanging over roof laths or screwing to roof rafters, is described in DE 20 2004 008 499 U1. The rigid roof hooks are either formed from two brackets, whereby their connecting point is a screw connection with an elongated hole for setting the thickness of the roof laths, or formed from three brackets, whereby, in turn, a connecting point is used for setting the thickness of the roof lath and the second connecting point allows the length of the arm, which should accommodate the PV module, to be set, likewise with the aid of a screw connection with an elongated hole. For static reasons, the brackets have a relatively large rectangular metal section which must penetrate through the roof covering, that is to say between two roofing tiles which are arranged in such a manner as to be mutually overlapping, over its entire width. In addition, it is necessary, for aesthetic reasons and for the sealing of the roof covering, to process the roofing tile located under the rigid roof hook in terms of the width and thickness of the roof hook material, in order to obtain a corresponding accommodating groove. The processing of the roofing tile is expensive, time consuming and is associated with the voiding of the guarantee for the roofing tile and therefore the sealing of the roof covering. Furthermore, the rigid roof hook can, in the event of snow or wind loads arising, break the roofing tile located beneath it, due to the weakening brought about by its accommodating groove in which it lies, and therefore likewise destroy the sealing of the roof covering and endanger people by falling.

A fixing device for mounting PV modules on roofs, which device has a rigid roof hook which is formed in one piece and produced from cast aluminum in its basic form, is described in DE 10 2005 043 957 B3. The shape of the rigid roof hook only allows it to be fixed practically to roof rafters. Its one-piece construction without setting possibilities makes it in every dimensional value disadvantageously usable only for one design of a roof with particular roof laths, counter laths (in some cases) and roofing tiles. In this case also, the profile of the rigid roof hook is relatively large and rectangular for static reasons. It must also penetrate through the roof covering between two roofing tiles which are arranged in such a manner as to be mutually overlapping. The processing of the roofing tile necessary for this purpose is associated with the previously indicated disadvantages.

A fixing device for mounting PV modules on roofs, which device again has a roof hook which can be fixed to roof rafters and does not have a setting element, so that it is in each case only suitable for one roof design, is described in DE 10 2004 057 041 A1. The roof hook is configured in the shape of a spiral spring and allows mounting of the solar module above the roof covering without touching the latter. In the event of wind load, the spring action of the load on the roofing tile surrounded by the roof hook can thus be reduced. However, in this case also, the hook profile is relatively large and rectangular for static reasons. It must also penetrate through the roof covering between two roofing tiles and the processing necessary for this purpose is associated with the already known disadvantages.

A further fixing device with relatively large roof hooks is described in DE 103 44 202 A1. As an alternative, fixing devices with special roofing tiles with inset rail systems are shown. The fixing device with roof hooks does not differ substantially from the fixing devices with the known disadvantages described further above. The fixing device with special roofing tiles is limited to the roofing tile formats produced with it and cannot therefore be used everywhere.

A fixing device for mounting PV modules on roofs with sheet metal cladding is described in DE 10 2005 061 709 A1. Here, the relatively large roof hooks are fixed externally to the roof covering, whereby rivets penetrating the roof covering are used.

In the Brochure I, "The ClickFit Mounting Structure for PV Systems" from the company ClickFit (which can be accessed at the Internet address click-fit.com/download/ClickFit-Brochure-EN.pdf, as of Jan. 9, 2008), the system and the use of simple roof hooks for fixing rails is described in clear images and associated texts. The rails then accommodate the photovoltaic modules. It becomes clear that in the case of unprocessed roofing tiles, the next roof layer cannot rest flushly over the roof hook.

In the Brochure II "LORENZ SoloSolar module mounting system, Pitched roof, one layer" from the company energiebau solarstromsysteme gmbh (which can be accessed at the Internet address eb.etamis.de/05_downloads/03_montage/01_LORENZ_solo.pdf as of Jan. 9, 2008), a further roof hook system is described in the graphics, which roof hook system clearly shows a processed roofing tile (plain tile) in the middle image on page 3.

SUMMARY

In an embodiment, the present invention provides a fixing device for fixing a photovoltaic module on a sloping roof having a roof structure and a roof covering including individual roof covering elements. The fixing device includes a flexible retaining element interconnecting a roof-side connecting piece and a module-side connecting piece. The roof-side connecting piece is disposable beneath the roof covering and the module-side connecting piece is disposable on an edge of the photovoltaic module. The flexible retaining element is loaded by pulling and adapted to be guided through the roof covering without altering a position or shape of the individual roof covering elements.

BRIEF DESCRIPTION OF THE DRAWINGS

Embodiments of the fixing device for photovoltaic modules on sloping roofs according to the invention are described in more detail hereinafter, with reference to the schematic figures, for their further understanding. However, the invention is not limited to the exemplary embodiments. Other features and advantages of various embodiments of the fixing device for photovoltaic modules according to the present invention will become apparent by reading the following detailed description with reference to the attached drawings which illustrate the following.

DETAILED DESCRIPTION

Figure 1:
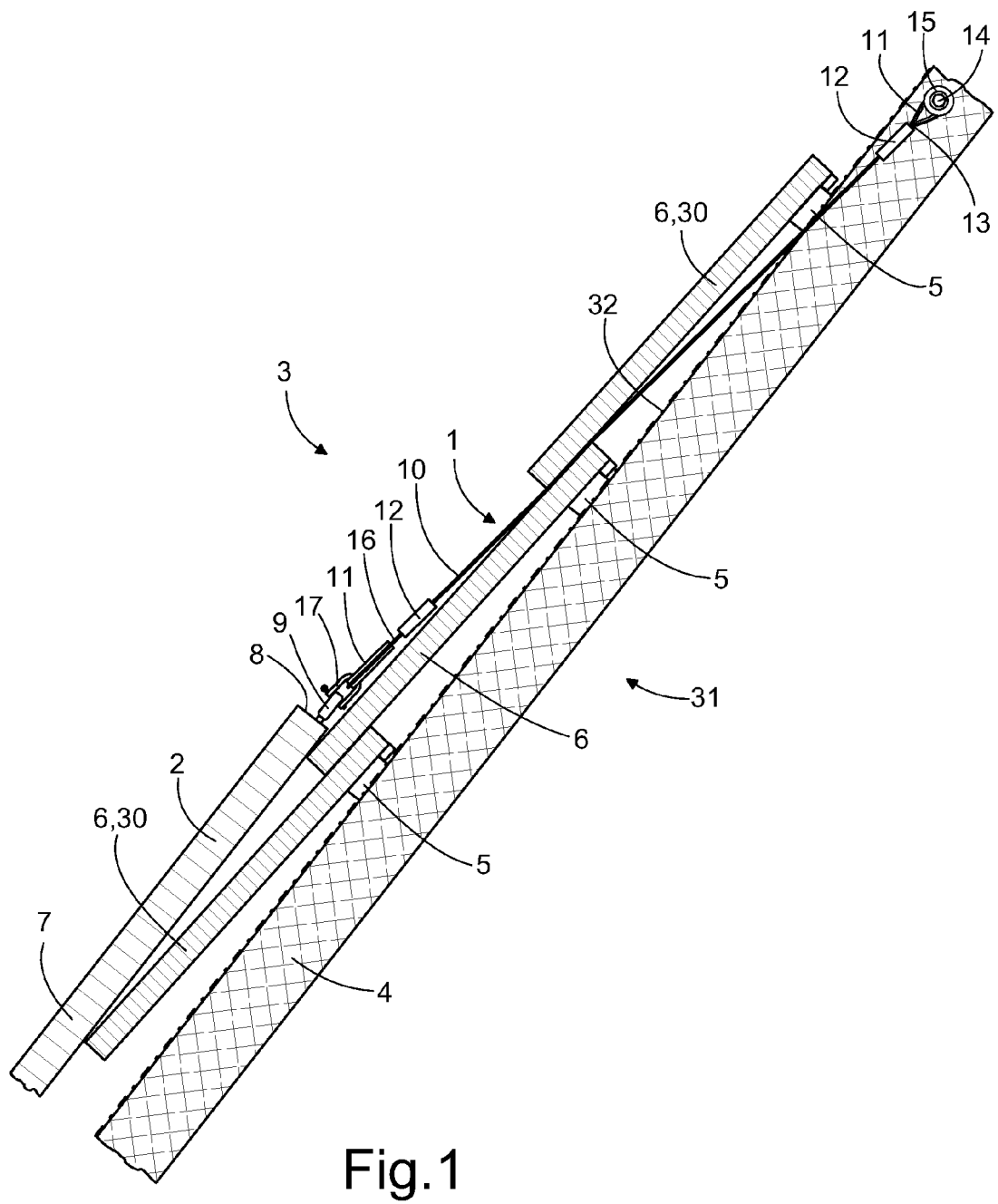
FIG. 1 shows a section through a roof covering with a photovoltaic module and a fixing device with rope.

An aspect of the present invention is to avoid expensive and/or dangerous roof hooks as a fixing device for photovoltaic modules on sloping roofs. Roof hooks which weaken the strength of the relevant roofing tiles or form gaps in the covering region are necessarily expensive. In accordance with an embodiment of the present invention, a simpler, more cost-effective and safer system which also substantially avoids the endangerment of people is provided.

It is also an aspect of the present invention that the retaining element is a flexible component which can be loaded by pulling exclusively and which can be guided through the roof covering without changing the position or shape of the individual elements of the latter.

According to an embodiment of the present invention, the roof hooks are replaced by flexible components. These flexible components are fixed to the roof structure (rafters or roof lathing) and guided out between the roofing tiles. The photovoltaic modules are fixed to the flexible components directly, e.g. to their frame, or by means of rail systems. One advantage of this system over the roof hook system is a faster and easier completion of the fixing device. Additionally, the roofing tiles no longer require processing. A direct destruction or a formation of a gap is thus avoided. The forces arising in the flexible component act parallel to the roof covering. The indirect damage in the event of wind and snow loads that result from compressive forces is therefore also avoided. Using the flexible component and the changed force introduction allows the fixing device to be constructed in a material saving manner. In one embodiment of the fixing device according to the present invention, the flexible component is a rope. Rope is sold by the meter, is available in all shapes and materials and can be fixed using standard elements. Preferably, the rope is either a wire rope, preferably made from stainless steel, or a synthetic fiber rope, preferably made from high strength and UV-stable synthetic fibers. For reasons of stability, the load should be divided between at least two ropes. In the case of using stainless steel ropes or high strength UV-stable synthetic fiber ropes, their cross section can also be relatively small, taking the necessary safety factors into account, that an impairment of the roofing tiles affected by it does not occur and an undisturbed roof covering remains intact.

Preferably, the rope 10 is encapsulated with a protective sheathing 40. A thin protective sheathing 40 protects against mechanical damage to the rope 10 in the case of rough operation on a building site during the laying of the roofing tiles and does not reduce the above described advantages of a fixing device 1 with ropes 10.

In an embodiment of the present invention, the roof-side connecting piece is a rope loop which can be strengthened with a cable-eye stiffener and secured with a rope clamp or a ferrule, wherein the rope loop can be mounted on an element of the roof structure, on a hook fixed there, or fixed with a screw with a collar or a washer. The module-side connecting piece is a rope loop which can be strengthened with a cable-eye stiffener and secured with a rope clamp or a ferrule, wherein the rope loop can be fixed directly to the edge of the photovoltaic module or to a rail system, which supports the photovoltaic module, with a ring eyelet or a swing hook, in each case directly or with a carabiner hook or shackle. The simplest and most cost effective, while at the same time proven and safe, form of fixing a rope to the roof substructure is that with a cable-eye stiffener, in order to prevent bending. The rope end is laid around the outer contour of the cable-eye stiffener, in its channel-shaped depression and fixed with the approaching rope in a ferrule or with a rope clamp that can be screwed together. The cable-eye stiffener can then be mounted on a hook or fixed to the roof structure with a screw connection in such a manner that the rope runs as straightly as possible between the roofing tiles provided and in this manner cannot exert compressive and flexural forces on either the roofing tiles or on itself. On the side of the photovoltaic module, the same rope ends can be connected to ring eyelets provided on the frame by means of shackles or mounted on open swing hooks. Only commercially available parts are therefore used in the construction and no specially produced profiles are used.

Preferably, the rope is also provided with an apparatus for length adjustment. A very simple adjustment of the position of the photovoltaic modules is possible by means of a length change of the rope with the aid of an apparatus for length adjustment, e.g. a normal rope winder with a housing and eyelet bolts which engage from both sides by means of a left-handed and a right-handed thread in each case.

Further, the flexible components can be constructed as ropes with a flat rectangular cross section, likewise made from stainless steel or UV-resistant synthetic fibres, or as thin high strength steel strips. In the case of elevated loads or roofing tiles consisting of particularly small parts, flat rectangular cross sections have the advantage compared to round cross sections in that that they can have a constant height as the width increases and thereby result in a gap-free laying of the roofing tiles. Particularly flat steel strips, as they are known for example for tape measures, can be produced to be wide and particularly thin and so that they are able penetrate through between closely adjoining roofing tiles. Connection elements can then e.g. be riveted.

In accordance with an embodiment of the present invention, the roof-side connecting piece is a thickening of the retaining element which is retained by an accommodating element of a flat stop plate, wherein the flat stop plate can be fixed to a roof rafter and the accommodating element is securely connected to the stop plate and has a continuous longitudinal slot for inserting the retaining element and a non-continuous enlarged opening for accommodating the thickening of the retaining element. In the case of this form of the fixing device, the sarking membrane, which rests directly on the roof rafters, is only penetrated by a small number of nails or screws for fixing the stop plate and is not substantially uncontrollably penetrated by the retaining element itself. The surrounding of the nail or screw holes in the sarking membrane is, in this case, also still ensured by the entire contact surface of the stop plate so that moisture penetration and tearing of the sarking membrane cannot occur. The thickening of the retaining element can, in the case of a rope, be e.g. a ferrule, a splice or a rope clamp, and, in the case of a flat steel strip, a thickened flat material which is fixed by screwing or riveting. In all cases, it is advantageous if the enlarged opening for accommodating the thickening of the retaining element corresponds to the profile of the thickening. The non-continuous enlarged opening ensures that the thickening of the retaining element, and therefore the retaining element itself, is retained securely in the accommodating element and the weight force of the PV modules is safely introduced into the roof rafter by means of the retaining element.

FIG. 1 shows a fixing device 1 for photovoltaic modules 2 in a section through a roof structure 31. In the exemplary embodiment shown, it consists of a roof rafter 4, roof laths 5 and a roof covering 3 made from a sarking membrane 32 and individual elements 30, roofing tiles 6 here. The photovoltaic module 2 frame 7 rests on the roofing tiles 6. Ring eyelets 9 are attached to the upper edge 8 of the frame 7 of the photovoltaic module 2. The fixing device 1 comprises a retaining element 24 which is a flexible component which can be loaded by pulling exclusively and which can be guided through the roof covering 3 without changing the position or shape of the individual elements 30, roofing tiles 6 here, of the latter. In the exemplary embodiment shown, the fixing device 1 includes a rope 10 which is guided around cable-eye stiffeners 11 and is secured in this exemplary embodiment with ferrules 12. The rope 10 equipped in this manner is fixed to the roof rafter 4 with its roof-side connecting piece 13 with a screw 14 with a large washer 15 guided through the cable-eye stiffener 11. The rope 10 is then guided through in an approximately straight line between the adjacent roofing tiles 6 and connected to the ring eyelet 9 with its module-side connecting piece 16 by means of a shackle 17.

Figure 2:
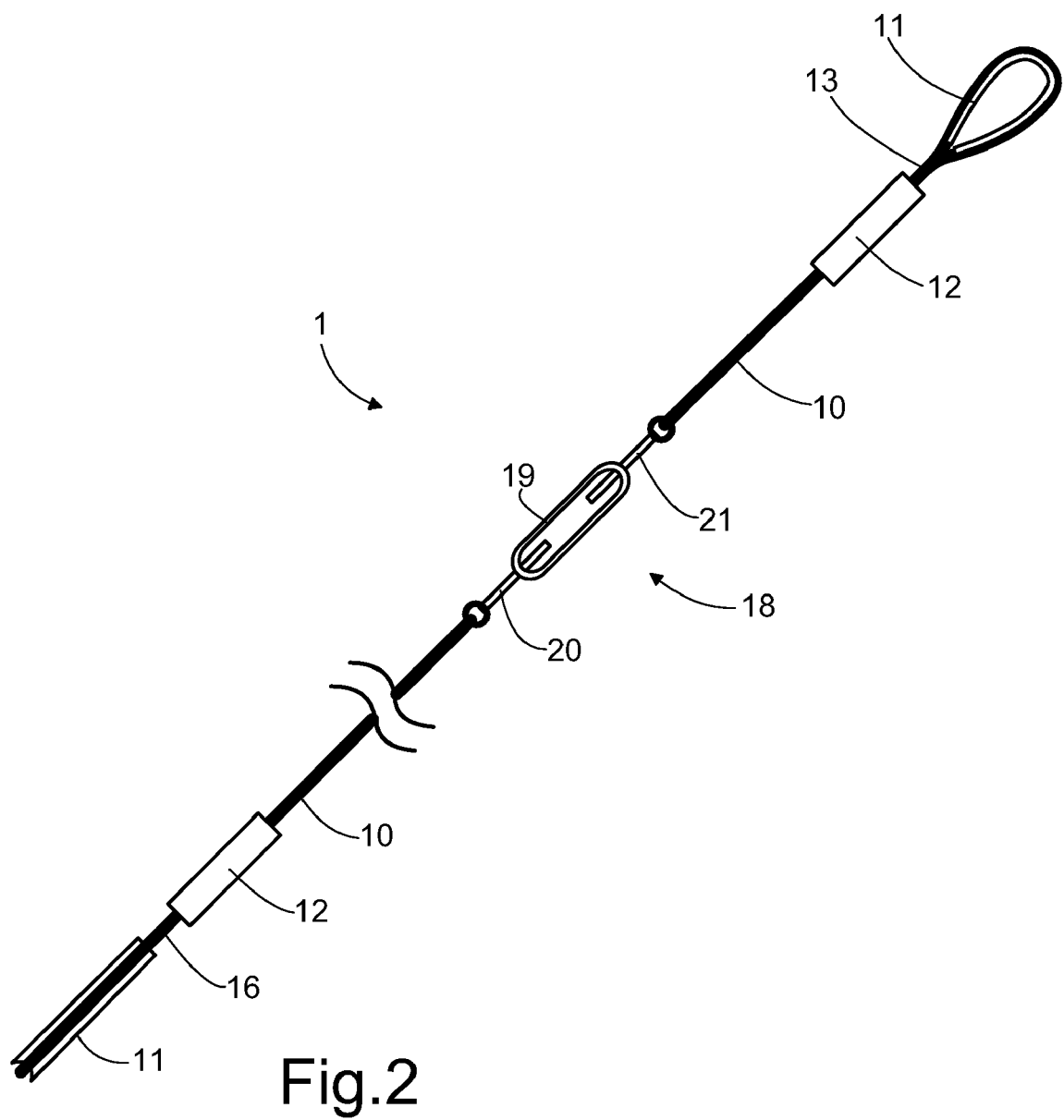
FIG. 2 shows a fixing device with rope and an apparatus for length adjustment.

FIG. 2 shows a fixing device 1, wherein the rope 10 is interrupted by an apparatus for length adjustment 18 in the region of the upper end 13. At the roof-side and module-side connecting pieces 13, 16, the rope 1 is guided around the cable-eye stiffeners 11, which are hereshown at the upper end 13 in the plan view and at the lower end 16 in the side view, and secured with ferrules 12. The apparatus for length adjustment 18 has a housing 19 and a ring bolt 20 with right-handed thread and a ring bolt 21 with left-handed thread. The fixing of the rope 10 to the ring bolts 20 is not detailed any further here. In the case of a rotation of the housing 19 in the clockwise direction as seen from the upper end 13, the fixing device 1 is shortened, and in the case of a rotation in the counter-clockwise direction, the fixing device 1 is lengthened.

Figure 3:
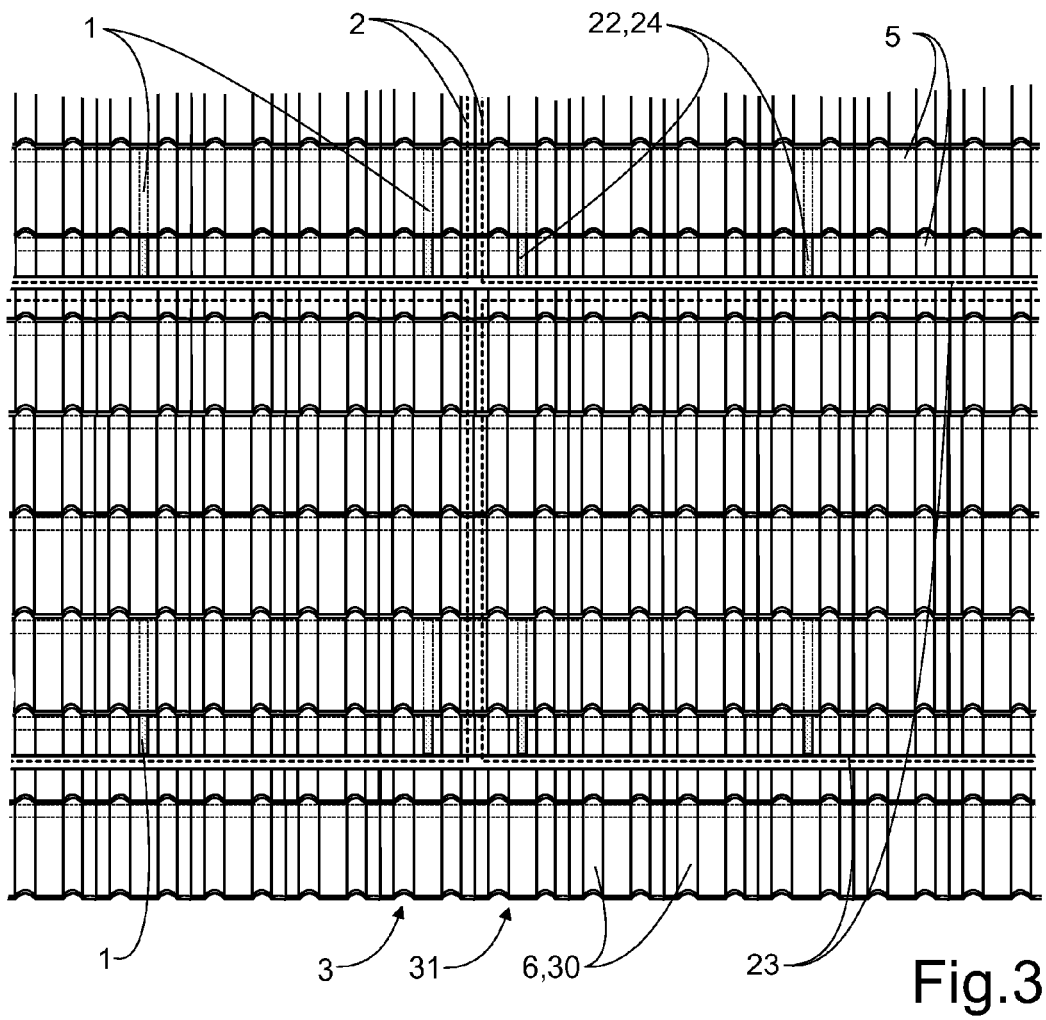
FIG. 3 shows a module arrangement utilizing fixing devices with steel strips.

FIG. 3 shows a module arrangement with retaining elements 24 including steel strips 22 on supporting rails 23. The supporting rails 23 rest on the roof covering 3 and are fixed to steel strips 22 which penetrate upwards under the next laid individual element 30, roofing tile 6 here, through the roof covering 3 and are fixed to the next roof lath 5 of the roof structure 31. Roof laths 5 and the parts of the steel strips 22 which extend underneath the roof covering 3 are indicated with dashed lines. Likewise illustrated with dashed lines are the PV modules 2 which are retained in the supporting rails 23. Further elements for connecting the PV modules 2 to one another are not illustrated.

Figure 4:
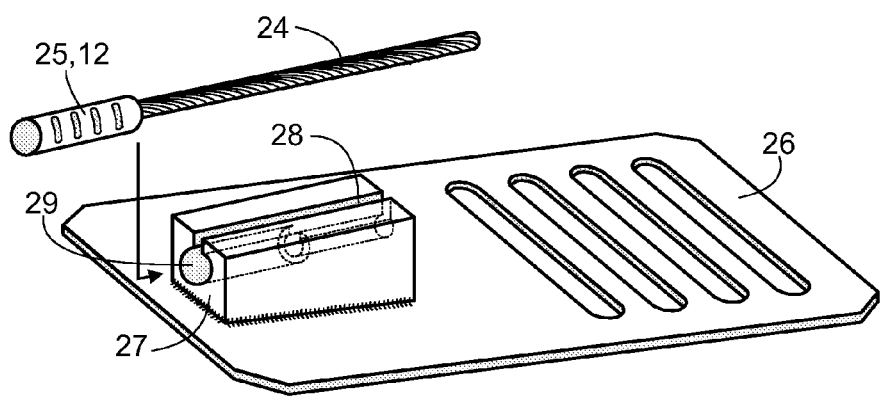
FIG. 4 shows a flat stop plate with an accommodating element.
Figure 5:
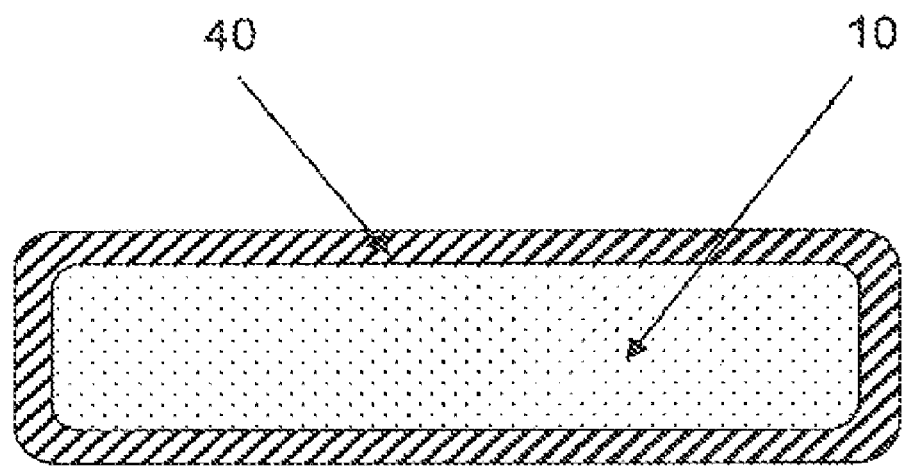
FIG. 5 shows a cross-section of an embodiment of the rope having a protective sheathing.

FIG. 4 shows a flat stop plate 26, which can be connected to a roof rafter 4, e.g. by means of nails or screws via elongated holes. It has an accommodating element 27 which is a cuboid component which is securely connected to the stop plate 26 in the exemplary embodiment. The accommodating element 27 includes a continuous longitudinal slot 28 for inserting the retaining element 24. A non-continuous enlarged opening 29 accommodates the thickening 25 of the retaining element 24. In the figure, a round rope is indicated by way of example as retaining element 24 with a ferrule 12 as thickening 25.

While the invention has been particularly shown and described with reference to preferred embodiments thereof, it will be understood by those skilled in the art that various changes in form and details may be made therein without departing from the spirit and scope of the invention.

What is claimed is:

1. A fixing device for fixing a photovoltaic module on a sloping roof having a roof structure and having a roof covering including individual roof covering elements, the fixing device comprising:
   a roof-side connecting piece disposed beneath the roof covering;
   a module-side connecting piece disposed on the top edge of the photovoltaic module; and
   a rope secured at one end to the module-side connecting piece and configured to connect the roof-side connecting piece and the module-side connecting piece, the rope being loadable by pulling and adapted to be guided through the roof covering without altering a position or shape of the individual roof covering elements.

2. The fixing device according to claim 1, wherein the rope is a wire rope.

3. The fixing device according to claim 2, wherein the wire rope includes stainless steel wire.

4. The fixing device according to claim 1, wherein the rope is a synthetic fiber rope.

5. The fixing device according to claim 4, wherein the synthetic fiber rope includes high-strength, ultraviolet-stable synthetic fibers.

6. The fixing device according to claim 1, wherein the rope includes a protective sheathing.

7. The fixing device according to claim 1, wherein the roof-side connecting piece includes a rope loop strengthened by a cable-eye stiffener and secured by at least one of a rope clamp and a ferrule, and wherein the rope loop is affixable to the sloping roof via at least one of an element of the roof structure, a hook, a screw and a washer.

8. The fixing device according to claim 1, wherein the module-side connecting piece includes a rope loop strengthened by a cable-eye stiffener and secured by at least one of a rope clamp and a ferrule, and wherein the rope loop is affixable to an edge of the photovoltaic module via at least one of a ring eyelet, a swing hook, a carabiner hook and a shackle.

9. The fixing device according to claim 1, wherein the rope includes an apparatus configured to adjust a length thereof.

10. The fixing device according to claim 1, wherein the a rope has a flat and rectangular cross-section.

11. The fixing device according to claim 1, wherein the roof-side connecting piece includes:
- a stop plate adapted to be affixed to a roof rafter; and
- an accommodating element affixed to the stop plate and having a continuous longitudinal slot corresponding to the rope and a non-continuous enlarged opening,
- wherein the rope includes a thickening corresponding to the non-continuous enlarged opening so as to secure the rope to the stop plate.

12. The fixing device according to claim 1, wherein the roof-side connecting piece includes:
- a stop plate adapted to be affixed to a roof rafter;
- an accommodating element affixed to the stop plate and having a continuous longitudinal slot corresponding to the rope and a non-continuous enlarged opening; and
- a ferrule disposed at an end of the rope and corresponding to the non-continuous enlarged opening so as to secure the rope to the stop plate.

13. The fixing device according to claim 1, wherein the rope is loadable only by pulling.

* * * * *